(12) United States Patent
McCann et al.

(10) Patent No.: US 8,417,941 B2
(45) Date of Patent: Apr. 9, 2013

(54) APPARATUS AND METHOD TO PREVENT MAN IN THE MIDDLE ATTACK

(75) Inventors: Daniel McCann, Regina (CA); Nima Sharifimehr, Regina (CA)

(73) Assignee: Olympia Trust Company, Calgary (CA)

( * ) Notice: Subject to any disclaimer, the term of this patent is extended or adjusted under 35 U.S.C. 154(b) by 0 days.

(21) Appl. No.: 12/991,233

(22) PCT Filed: May 5, 2009

(86) PCT No.: PCT/CA2009/000648
§ 371 (c)(1),
(2), (4) Date: Feb. 3, 2011

(87) PCT Pub. No.: WO2009/135324
PCT Pub. Date: Nov. 12, 2009

(65) Prior Publication Data
US 2011/0154021 A1    Jun. 23, 2011

(30) Foreign Application Priority Data
May 5, 2008    (CA) .................................... 2630388

(51) Int. Cl.
*H04L 9/32*    (2006.01)
*H04L 29/06*    (2006.01)

(52) U.S. Cl. ........ 713/153; 713/155; 713/156; 713/176; 726/18; 726/21

(58) Field of Classification Search .......... 713/153–158, 713/173–177; 726/2, 10, 18, 21; 709/203, 709/217–228
See application file for complete search history.

(56) References Cited

U.S. PATENT DOCUMENTS

| | | | |
|---|---|---|---|
| 5,671,417 A | 9/1997 | Miclette et al. | |
| 7,409,552 B2* | 8/2008 | Buttyan et al. | 713/172 |
| 8,009,829 B2* | 8/2011 | Jueneman et al. | 380/28 |
| 8,213,902 B2* | 7/2012 | Rowley | 455/411 |
| 8,219,804 B2* | 7/2012 | Hong | 713/156 |
| 2002/0023112 A1 | 2/2002 | Avital | |

(Continued)

OTHER PUBLICATIONS

Meyer, U., Wetzel, S., "On the Impact of GSM Encryption and Man-in-the-Middle Attacks on the Security of Interoperating GSM/UMTS Networks", 15th IEEE International Symposium on Personal, Indoor and Mobile Radio Communications, Sep. 5-8, 2004, pp. 2876-2883, vol. 4.

(Continued)

*Primary Examiner* — Haresh N Patel
(74) *Attorney, Agent, or Firm* — Trego, Hines & Ladenheim, PLLC

(57) ABSTRACT

A system, peripheral device, and method for authenticating an encryption key before transmitting encrypted messages containing sensitive information are provided. Authentication of a client device during the coordination of data transfer among multiple computer devices is possible by providing a peripheral device that does not have a direct connection to a network, but rather, any message to be transmitted over the network must be relayed through a client device. Any sensitive information to be transferred to a remote device is inserted into a message, then the message is encrypted in the peripheral device. This prevents any process running on the client device from fooling the client device into communicating confidential information to a third party rather than the desired remote computer, because the client device never sees the sensitive information in an unencrypted form; only the peripheral device has access to the sensitive information in an unencrypted form.

36 Claims, 10 Drawing Sheets

U.S. PATENT DOCUMENTS

| | | | |
|---|---|---|---|
| 2005/0125661 A1* | 6/2005 | Vaidyanathan | 713/166 |
| 2006/0043164 A1* | 3/2006 | Dowling et al. | 235/375 |
| 2007/0118732 A1* | 5/2007 | Whitmore | 713/155 |
| 2008/0028206 A1* | 1/2008 | Sicard et al. | 713/156 |
| 2008/0028208 A1* | 1/2008 | Bolcer et al. | 713/156 |
| 2008/0098230 A1* | 4/2008 | Kalibjian et al. | 713/176 |
| 2008/0098478 A1* | 4/2008 | Vaidya et al. | 726/24 |
| 2008/0130895 A1* | 6/2008 | Jueneman et al. | 380/277 |

OTHER PUBLICATIONS

Otrok, H., Mourad, A., Debbabi, M., Assi, C., "Improving the Security of SNMP in Wireless Networks", International Conference on Wireless Networks, Communications and Mobile Computing, Jun. 13-16, 2005, pp. 198-202, vol. 1.

* cited by examiner

APPARATUS AND METHOD TO PREVENT MAN IN THE MIDDLE ATTACK

This invention is in the field of coordinating multiple computer devices for communication and more particularly the authentication of a computer device during the coordination of data transfer among multiple computer devices.

BACKGROUND

Security of information being transferred over the internet is of great importance to many users, especially when the information being transferred contains particularly confidential information such as credit card numbers, etc. that a person does not want to fall into the hands of a third party.

Almost all transmissions of confidential information over the Internet are encrypted to prevent it from being intercepted and used by third parties. Whenever a client computer connects and transmits information to a remote computer or server an elaborate "hand shake" method of authenticating the devices and providing algorithms and codes to encrypt the information is performed. This encryption is used to prevent the transmission from being intercepted and read by a third party if it happens to be intercepted. A third party is hopefully unable to decrypt the encrypted information making the encrypted information inaccessible to third parties. This secures the information as it is transmitted over the Internet.

However, the confidential information is susceptible if it is intercepted in an unencrypted form on the client computer. A Trojan horse program or other program can be secretly installed on a client computer in which the confidential information is present in an unencrypted form. If a user types in the confidential information or the confidential information is available in an unencrypted form on the client computer, the program may be able to obtain the confidential information before it is encrypted by the client computer and pass the information on to a third party that caused the program to be installed on the client computer.

One way this problem has been addressed is to have a separate computer device connected to a client computer. The client computer is connected to the internet and is capable of communication with other devices over the internet. The separate computer device however is not connected to the internet, but rather is connected directly to the client computer and only capable of communicating with the client computer. When confidential information has to be sent to a remote device over the internet, the separate device obtains the confidential information and inserts it into the message to be sent. The separate computer device then encrypts the message containing the confidential information before passing it back encrypted to the client computer for transmission to a remote computer. The confidential information could be obtained by having a user manually enter it into the separate computer device with a keypad, swipe strip, memory card, etc. or it could already be present on the separate device. Because the separate computer device is only in communication with the client computer and is not accessible through the internet directly, any communication over the internet must be done through the client computer. This prevents a Trojan horse or other program resident on the client computer from gaining access to the unencrypted confidential information.

However, while this provides the separate computer device with very beneficial advantages in regards to the confidential information being inaccessible by the client computer or any other remote computer that has gained access to the client computer, it causes the separate computer device to be dependent on the client computer for any information it needs to obtain through the Internet. A process running on the client computer could be used to create a man-in-the-middle attack, fooling the separate computer device into communicating the confidential information to a third party rather than the desired remote computer.

SSL and TLS are cryptographic protocols used to provide secure transmission of information over the internet. These protocols typically provide authentication of the endpoint (the remote computer the client device is in communication with) and encryption of the information to be communicated. Typically, three basic phases are used: the handshake or peer negotiation phase; the key exchange and authentication phase; and the encryption and message authentication phase. In the handshake phase, the two communication devices determine algorithms that will be used in the communication including the cipher and hash algorithms. In the key exchange and authentication phase the server typically sends back a digital certificate which contains the server's name, a trusted certificate authority and the server's public encryption key. In the encryption and message authentication phase, messages between the client and server are encrypted, sent, decrypted and authenticated.

The digital certificate used in the key exchange and authentication phase contains a digital signature that combines a public key that the client computer can use for encryption with information identifying the remote computer and the organization behind the remote computer. The digital certificate is meant to allow the client computer to verify that a received public key originated from the remote computer. In many cases, the digital certificate usually contains a trusted certificate authority.

In theory, the client computer can contact the server of the trusted certificate authority to confirm that the digital certificate is authentic before proceeding with communication with the remote computer. However, in many cases, the trusted certificate authority providing the digital certificate is unknown to the client computer so another digital certificate provided by a higher certificate authority is used to verify the first digital certificate. In this manner a chain of ever higher digital certificates are used with each higher digital certificate verifying the certificate authority issuing the lower digital certificate. In this manner, a certification path consisting of this chain of digital certificates is used until a root certificate issued by a certificate authority theoretically trusted by all is reached, ending the chain.

Because the separate computer device only has access to the Internet through the client computer in order to obtain its security benefits, the separate computer device must receive the digital certificate and the certificate path including the root certificate from the client computer. Typically, a client computer uses the digital certificate to authenticate a remote computer by obtaining the public key of the certificate authority that has "signed" the certificate. The digital certificates work by allowing a device to obtain the public key directly over the Internet to confirm the digital certificate is valid. Typically, the public key of the root certificate issuer is obtained and used with the certification path to verify all of the digital certificates down to the original one provided by the remote computer.

The client computer can easily obtain over the internet the well known public key of the authority providing the root certificate (although typically these public keys are updated periodically and often stored on the client computers themselves). However, because the separate computer device does not have direct access to the Internet, but rather only indirect access through the client computer, the separate computer device must accept information provided by the client computer. This means that to obtain a key associated with a root certificate, the separate computer device must receive the root certificate from the client computer. If the client device is compromised, the client computer could be made to pass digital certificate, certification path and root certificate to the separate computer device claiming it is the correct digital certificate and certification path and the separate computer device will have to accept it as true because it cannot access the Internet to verify the accuracy of the root certificate. In this way, a third party can manufacture a false certificate and the separate computer device can be fooled into authenticating the third party rather than the intended remote device, causing the separate computer device to use an encryption key provided by the third party and share encrypted information with the third party that the third party can then decrypt, allowing the third party to decrypt the information and obtain the sensitive or confidential information.

It is desirable to provide a method and apparatus that has the advantages of using a separate computer device to encrypt messages that still allows the separate computer device to authenticate a public key belongs to a remote server.

SUMMARY OF THE INVENTION

It is an object of the present invention to provide a method and apparatus that overcomes problems in the prior art.

In a first aspect, a system for authenticating an encryption key before transmitting encrypted messages containing sensitive information comprises a client device which is a data processing system having at least one processor and at least one memory. The client device is connected to a network and operative to transmit and receive data over the network. The system further comprises a remote device which is a data processing system having at least one processor and at least one memory. The remote device is connected to the network and operative to transmit data to, and receive data from, the client device. The system further comprises a peripheral device operative to encrypt messages before passing the encrypted message to the client device for transmission to the remote device. The peripheral device has at least one processor and a memory containing a first key of a cryptographic key pair. In operation, the peripheral device is operatively connected to only the client device wherein the remote device transmits a digital certificate to the client device. If the digital certificate does not contain an encryption key, the remote device transmits an encryption key to the client device separately. The digital certificate is associated with an encryption key [that can be embedded inside the certificate or separately received from the remote device] and a first digital signature issued by a certificate authority to verify the digital certificate is associated with the remote device. In response to receiving the digital certificate and the encryption key from the remote device, the client device passes the digital certificate, the encryption key if it is not embedded inside the digital certificate, a root certificate associated with the digital certificate, and a second digital signature to the peripheral device. The second digital signature is associated with the root certificate and created using a second key of the cryptographic key pair. In response to receiving the digital certificate, the root certificate, and the second signature, the peripheral device uses the root certificate to certify the digital certificate. The peripheral device uses the first digital signature in the digital certificate to verify the digital certificate is associated with the remote device. The peripheral device retrieves the first key of the cryptographic key pair from the memory of the peripheral device and applies the first key of the encryption key pair to the second digital signature to verify the root certificate. Finally, the peripheral device uses the digital certificate to validate the encryption key if it is not embedded in the digital certificate.

In a second aspect, a peripheral device comprises at least one processor and at least one memory containing a first key of a cryptographic key pair. The peripheral device is operatively connectable to a client device connected to a network. The client device is operative to transmit messages to, and receive messages from, a remote device connected to the network. In operation, the peripheral device is operative to encrypt messages before passing the encrypted messages to the client device for transmission to the remote device wherein the peripheral device verifies an encryption key originated from the remote device by the client device receiving a digital certificate from the remote device. The digital certificate is associated with an encryption key and a first digital signature. The encryption key can either be embedded inside the certificate or can be separately received from the remote device. The first digital signature is issued by a certificate authority to verify that the digital certificate is associated with the remote device. In response to receiving the digital certificate from the remote device, the client device passes the digital certificate, a root certificate associated with the digital certificate, and a second digital signature to the peripheral device. The client device will also pass the encryption key if the encryption key is not otherwise embedded inside the digital certificate.

The second digital signature is associated with the root certificate and is created using a second key of the cryptographic key pair. In response to receiving the digital certificate, the encryption key, the root certificate, and the second signature, the peripheral device uses the root certificate to certify the digital certificate and the first digital signature in the digital certificate to verify the digital certificate is associated with the remote device. The peripheral device retrieves the first key of the cryptographic key pair from the memory of the peripheral device and applies the first key of the encryption key pair to the second digital signature to verify the root certificate. Finally, the peripheral device uses the digital certificate to validate the encryption key if the encryption key is not embedded in the digital certificate.

In a third aspect, a method of authenticating a remote server comprises providing a client device operatively connected to a remote device over a network, and further providing a peripheral device operatively connected to only the client device and having a memory containing a key. The client device receives a digital certificate which is associated with an encryption key and a first signature from the remote device. The encryption key can either be embedded inside the digital certificate or separately received from the remote device. The first signature is issued by a certificate authority to verify the digital certificate is associated with the remote device. The digital certificate passes from the client device to the peripheral device. A certification path beginning with the digital certificate and ending with a root certificate is passed from the client device to the peripheral device. The peripheral device verifies the encryption key in the digital certificate with the first signature in the digital certificate using the certification path including the root certificate. A second signature certifying the root certificate is passed to the peripheral device. The peripheral device retrieves the key from the memory of the peripheral device. The peripheral device checks the second signature using the retrieved key to verify the root certificate. Finally, the peripheral device uses the digital certificate to validate the encryption key if it is not embedded in the digital certificate.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

The methods and apparatuses provided in accordance with the present invention allow a separate computer device used to encrypt messages containing sensitive information off of a client device in communication with a remote device to authenticate a remote server using digital certificates.

Figure 1:
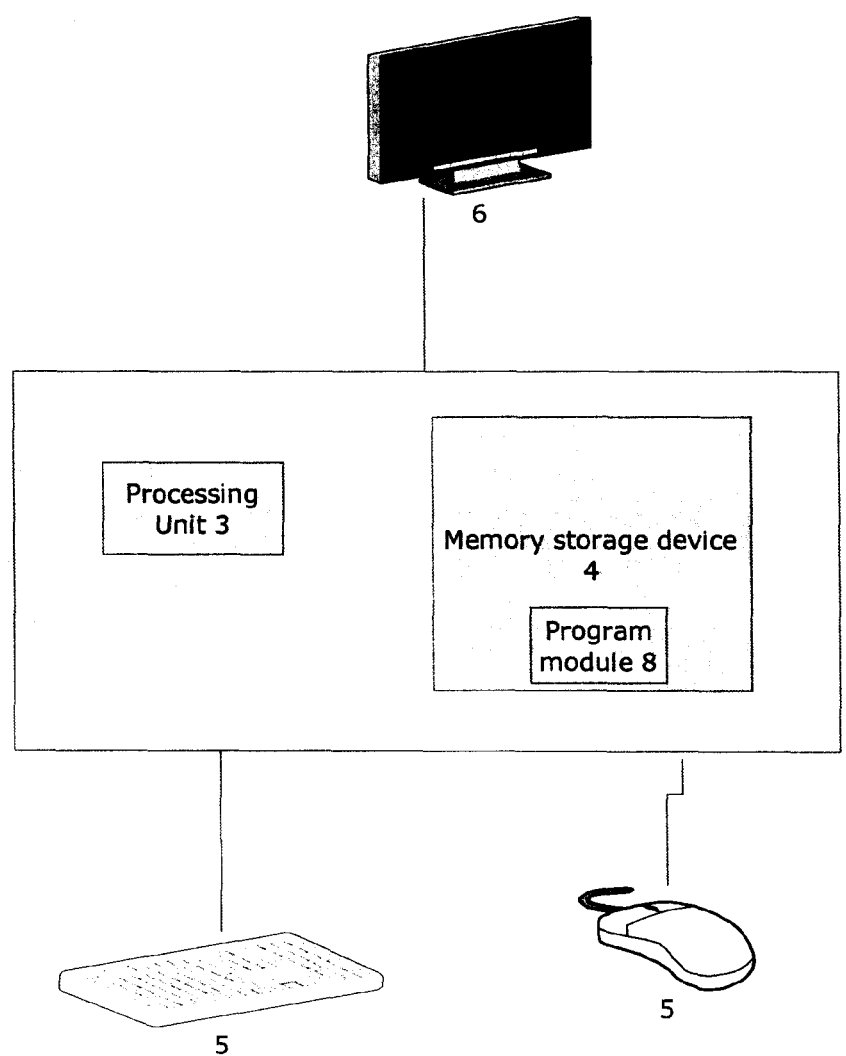
FIG. 1 is schematic illustration of a data processing system.

FIG. 1 illustrates a data processing system 1 suitable for supporting the operation of methods in accordance with the present invention. The data processing system 1 typically comprises: at least one processing unit 3; a memory storage device 4; at least one input device 5; a display device 6 and a program module 8.

The processing unit 3 can be any processor that is typically known in the art with the capacity to run the program and is operatively coupled to the memory storage device 4 through a system bus. In some circumstances the data processing system 1 may contain more than one processing unit 3. The memory storage device 4 is operative to store data and can be any storage device that is known in the art, such as a local hard-disk, etc. and can include local memory employed during actual execution of the program code, bulk storage, and cache memories for providing temporary storage. Additionally, the memory storage device 4 can be a database that is external to the data processing system 1 but operatively coupled to the data processing system 1.

The input device 5 can be any suitable device suitable for inputting data into the data processing system 1, such as a keyboard, mouse or data port such as a network connection and is operatively coupled to the processing unit 3 and operative to allow the processing unit 3 to receive information from the input device 5. The display device 6 is a CRT, LCD monitor, etc. operatively coupled to the data processing system 1 and operative to display information. The display device 6 could be a stand-alone screen or if the data processing system 1 is a mobile device, the display device 6 could be integrated into a casing containing the processing unit 3 and the memory storage device 4.

The program module 8 is stored in the memory storage device 4 and operative to provide instructions to processing unit 3 and the processing unit 3 is responsive to the instructions from the program module 8.

Although other internal components of the data processing system 1 are not illustrated, it will be understood by those of ordinary skill in the art that only the components of the data processing system 1 necessary for an understanding of the present invention are illustrated and that many more components and interconnections between them are well known and can be used.

Figure 2:
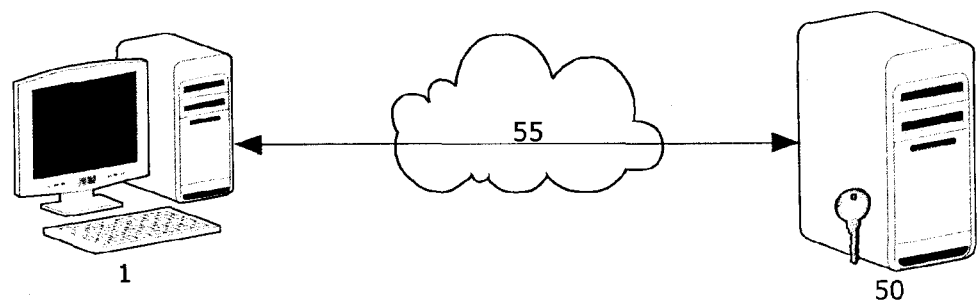
FIG. 2 is a schematic illustration of a prior art network configuration.

FIG. 2 illustrates a network configuration wherein the data processing system 1 is connected over a network 55, such as the internet, to a remote device 50, such as a web server. The remote device 50 could be web server operating as an online retailer through a set of web pages or any other entity that the user of the data processing system 1 wishes to securely transmit sensitive information to.

Figure 3:
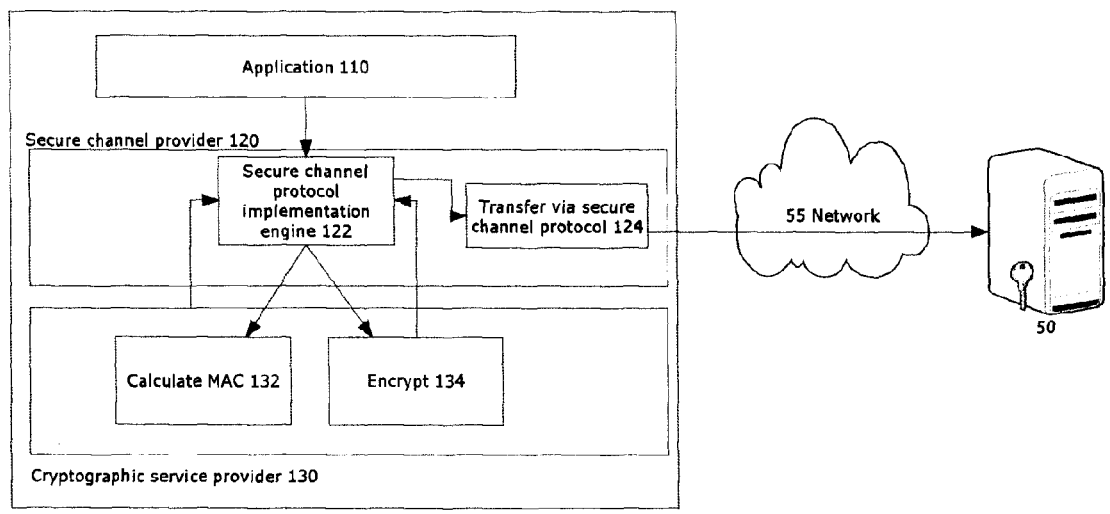
FIG. 3 is a flowchart illustrating a prior art method of encrypting a transmitting a message to a remote device.

FIG. 3 illustrates a flowchart of a conventional method of encrypting data to be transmitted to a remote device 50. In this conventional method, sensitive information is encrypted and transmitted to the remote device 50. Sensitive information can be any type of information that a user would like to protect. For example, when a user is transmitting his or her credit card number over the internet to a remote server, the user would like the transmission of his or her credit card information to be transmitted in a secured fashion so that the data is protected from interception by a third party as it is being transmitted to the server, so that the user does not have to worry about the third party obtaining his or her credit card information. This sensitive information could also be personal information, such as the user's contact information, or any information that a user does not want to be potentially seen by a third party.

An application 110 has data containing sensitive information that the application 110 would like to transmit to the remote device 50 over a secure connection. Typically, the application 110 would be a web browser and the data would be transmitted by a HTTP request (rather than being simply application to HTML, the present invention could be equally application to other types of applications such as XML, SOAP, etc.). The user would input the information to be transmitted, including the sensitive information, to the data processing system 1 and directly to the application 110, such as by the user filling in a form or text box on the web page they are accessing using the web browser.

Referring to FIG. 1, the user typically inputs information into the data processing system 1, running the application 110, by the means of an input device 5 such as a keyboard. For example, the user may wish to transmit his or her credit card number to the remote device 50, in order to make an online purchase. The user types his or her credit card information into the form provided by the web page using the input device 5. The application 110 then gathers this information inputted by the user and bundles it as the data to be transmitted in the HTTP request to the secure channel provider 120.

Alternatively, the information may be stored in the memory of the data storage device 4 and at the prompting of the user, the application 110 collects the sensitive information from the memory storage device 4 and bundles the sensitive information in a message to be transmitted to the remote device 50. The application 110 takes the data and bundles it into the body of the HTTP request as a message and passes the message containing the sensitive information to a secure channel provider 120. The secure channel provider 120 is a system operative to provide a secure connection to the remote server 50 and is typically a secure socket layer (SSL), transport layer security (TLS) or other set of software services that are capable of providing secured transmissions.

The secure channel provider 120 establishes a connection to the remote device 50 and prepares the message for transmittal.

However, before the data processing system 1 will initiate an open communication channel with the remote device 50, the data processing system 1 goes through a key exchange and authentication phase to try and ensure a public key preliminary messages are being encrypted with truly originated with the remote device 50 and not some imposter posing as the remote device 50. This involves the remote device 50 providing a digital certificate to the data processing system 1 that the data processing system 1 can use to authenticate the remote device 50.

The digital certificate uses a digital signature to bind together a public key with an identity, to allow the data processing system 1 to verify the public key came from a specific source (i.e. the remote device 50) and typically contains: an identification of the remote device; an identification of a certificate authority; and a public key; as well as a digital signature encrypted by the certificate authority. The data processing system 1 uses the public key provided by the certificate authority and the digital signature to verify issuer of the signature certifies the public key belongs to the remote device 50.

The certificate authority issuing the digital certificate can then be validating using a higher-level certificate authority and so on up a certification path until a root certificate is obtained and the entire certification path down to the digital certificate can be validated.

Once the handshake procedure is concluded and the digital certificate has been used to successfully authenticate the remote device 50, the data processing system 1 and the remote device 50 begin transmitting encrypted messages between them.

A secure channel protocol implementation engine 122 of the secure channel provider 120 prepares the message for transmission by having the message encrypted for transmission as well as adding a message authentication tag to the data. The secure channel protocol implementation engine 122 passes the message containing the sensitive information, to be transmitted to the remote device 50, to the cryptographic service provider 130. First, the secure channel protocol implementation engine 122 passes the message to the cryptographic service provider 130, along with a secret key, to determine a message authentication code (MAC or tag) at step 132 for the data to be appended to the message. The MAC allows the remote device 50 to authenticate the message when it has received and decrypted the message.

After the cryptographic service provider 130 determines a MAC for the message at step 132, the cryptographic service provider 130 passes the MAC back to the secure channel provider 120 and the secure channel protocol implementation engine 122 appends the MAC to the message.

Next, the secure channel protocol implementation engine 122 passes the message and the appended MAC, out of the secure channel provider 120, and back to the cryptographic service provider 130 to be encrypted at step 134. The cryptographic service provider 130 encrypts the message and the appended MAC into an encrypted unit, at step 134, and returns the encrypted unit to the secure channel provider 120 and the secure channel protocol implementation engine 122, where the encrypted unit is passed to a transfer via secure channel protocol 124 that adds a header to the encrypted unit and transmits the encrypted unit to the remote device 50.

Upon receiving the encrypted unit, the remote device 50 decrypts the encrypted unit and uses the MAC to authenticate the data. In this manner, the data processing system 1 and the remote device 50 can transmit a number of encrypted messages between them.

Figure 4:
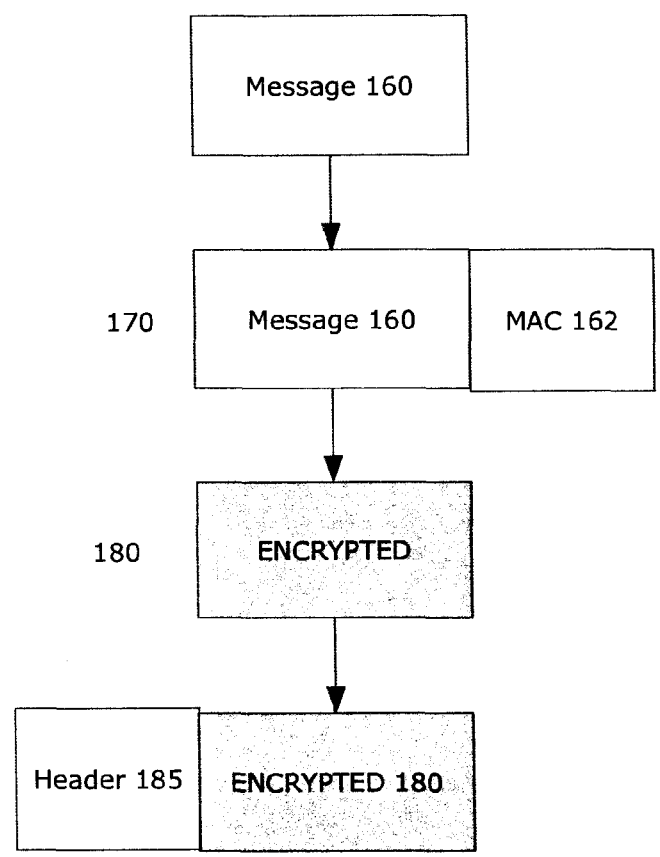
FIG. 4 is a schematic illustration of how data is altered for transmission in a conventional system.

FIG. 4 illustrates how the data is altered in the conventional method illustrated by the flowchart in FIG. 3, to prepare it for transmittal to the remote device 50. Referring to FIGS. 3 and 4, the application 110 makes the request for a secure transmission of data and passes the message 160 to the secure channel provider 120. At this point, the message 160 is unencrypted. The secure channel provider 120 passes the message 160 to the cryptographic service provider 130 where a MAC 162 is determined for the data 160 and the MAC 162 is passed back to the secure channel provider 120 where the secure channel provider 120 appends the MAC 126 to the message 160, to form a message unit 170.

The secure channel provider 120 then passes the message unit 170 back to the cryptographic service provider 130 where the message unit 170 is encrypted and an encrypted unit 180 is passed back to the secure channel provider 120, where a header 185 is appended to the encrypted unit 180 forming a data packet 190 which is then transmitted to the remote device 50.

While this method does protect a user from third parties that intercept the data packet 190 from obtaining the sensitive information, it does have security flaws. Specifically, if a viral program is monitoring inputs to the application 110 or outputs of the application 110, the sensitive information is accessible in an unencrypted state, either when a user inputs the sensitive information to the application 110 or when the application 110 transfers the message containing the sensitive information to the secure channel provider 120.

Figure 5:
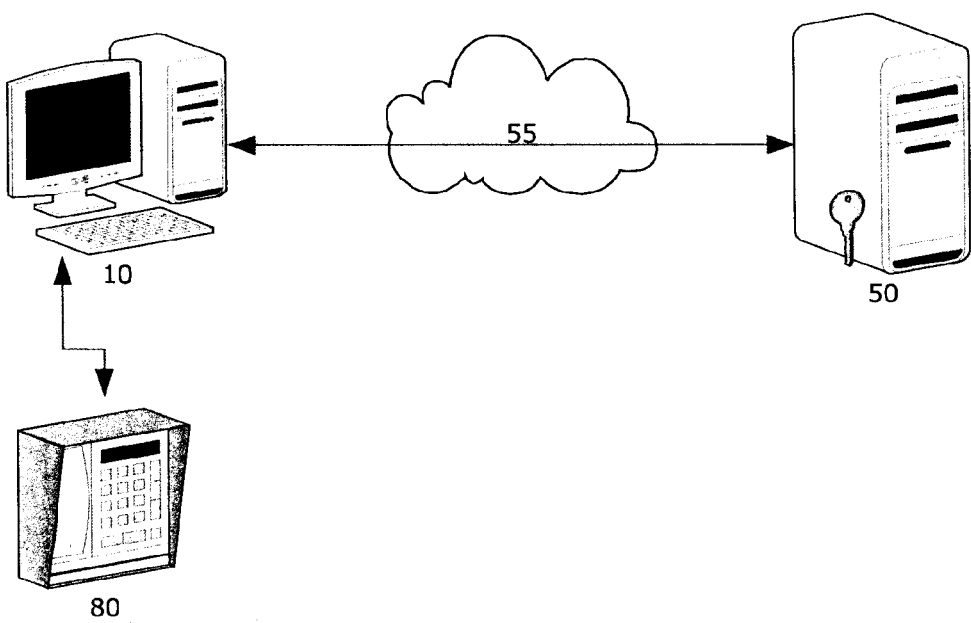
FIG. 5 is a schematic illustration of a network configuration with a peripheral device connected to the client device.

FIG. 5 illustrates a client device 10 which is a data processing system connected over the network 55, such as the Internet, to the remote device 50. The remote device 50 could be a web server operating as an online retailer through a set of web pages or any other entity that the user of the client device 10 wishes to securely transmit sensitive information to. Connected to and in communication with the client device 10 is a peripheral device 80. The connection between the client device 10 and the peripheral device 80 could be a USB, serial or other direct connection.

Typically the peripheral device 80 contains a card reader, key pad, or other system allowing sensitive information to be input to the peripheral device 80. The peripheral device 80 does not have a direct connection to the network 55, but rather any message to be transmitted over the network 55 by the peripheral device 80 must be relayed through the client device 10. The sensitive information to be transferred to the remote device 50 is inserted into the message to be transmitted and then the message is encrypted in the peripheral device 80. In this manner, only the peripheral device 80 has access to the sensitive information in an unencrypted form and the data processing system 1 never sees the sensitive information in an unencrypted form.

Figure 6:
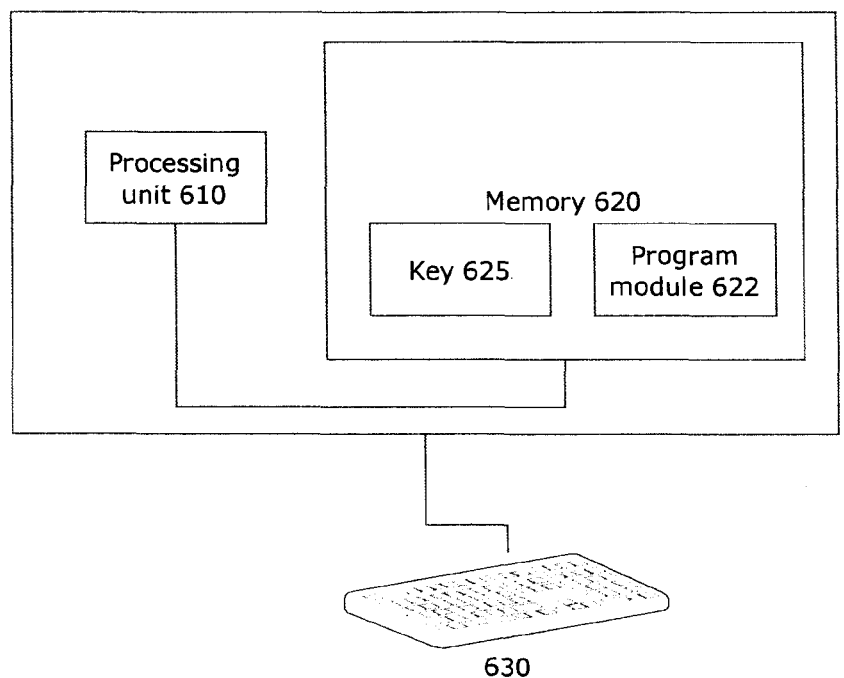
FIG. 6 is a schematic illustration of the peripheral device shown in FIG. 5.

FIG. 6 illustrates a schematic illustration of the peripheral device 80. Peripheral device 80 contains a processing unit 610 and a memory 620.

In an aspect, the memory 620 contains a program module 622 for containing program instructions enabling the peripheral device 80 to operate and at least one key 625 stored in the memory 620. The at least one key 625 is one key of a cryptographic key pair used for creating and verifying digital signatures. The corresponding key in the cryptographic key pair is kept secret by an entity and that entity uses the corresponding key to create digital signatures. Each digital signature is associated with a root certificate and by using the key 625 stored in the memory 620 and a digital signature issued by the holder of the corresponding key and associated with a root certificate, a public key contained in the associated root certificate can be verified.

Although the memory 620 could be a conventional memory such as a harddrive, etc., in an aspect, the memory 620 can be a permanent memory, such as a read only memory (ROM) or programmable read only memory (PROM) so that once the key 625 is written to the memory 620 the key 625 cannot be altered or replaced. In another aspect, the memory 620 could be alterable such as an erasable programmable read only memory (EEPROM) where the memory 620 is not easily alterable and cannot be altered remotely The peripheral device 80 also has an input device 630 that is used to enter sensitive information, such as a credit card number, etc. into the peripheral device 80 that will be transmitted to a remote device 50. The input device 630 could be a card reader, RFID tag reader, memory slot for a memory card/stick, keyboard, etc. that allows a user to input sensitive or confidential information into the peripheral device 80.

Figure 7:
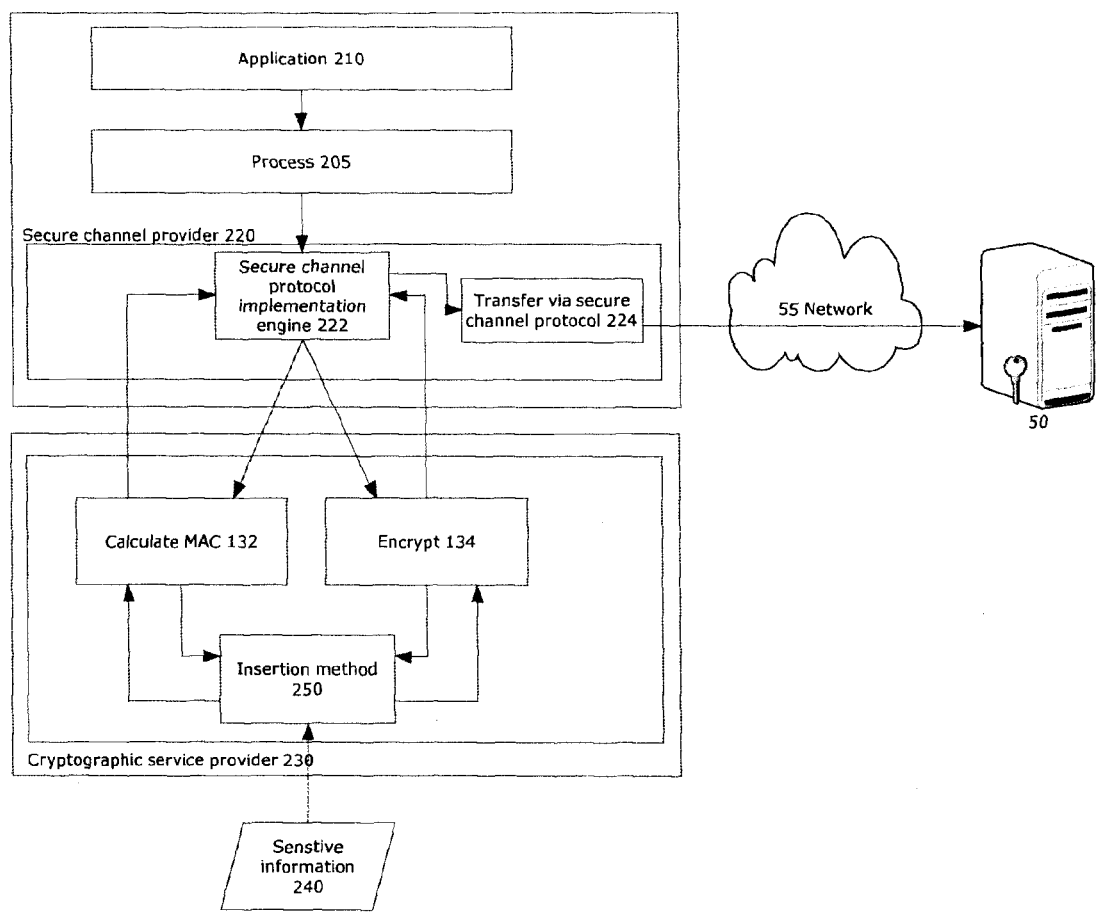
FIG. 7 is a flowchart illustrating a method of encrypting data on a peripheral device to be transmitted between two computer devices.

FIG. 7 illustrates a method of encrypting data to be transmitted to a remote device 50. Rather than allowing an application 210 running on the client device 1 access to sensitive information, the application 210 and a secure channel provider 220 never have access to the sensitive information in an unencrypted form, so that any data passed to or from the application 210 and secure channel provider 220 that is intercepted by a viral program will not result in a third party obtaining the sensitive information.

The application 210 has sensitive information that the application 210 would like to transmit to the remote device 50 over a secure connection. Typically, if the application 210 is a web browser, the application 210 generates an HTTP request to be transmitted to the remote device 50.

Rather than having the user input the sensitive information into the client device 10 through the application 210 directly, the application 210 generates a first message without inserting the sensitive information into the message. For example, if the application 210 is a web browser accessing a web page that requests a user's credit card number, rather than having the user enter his or her credit card number into the application 210, the application will assemble the first message with the sensitive information in the form of the credit card number and related information absent.

Before the first message is passed to a secure channel provider 220, a process 205 intercepts the first message and inserts insertion point codes (IPCs) into the first message to indicate where sensitive information is expected to be in the first message by the remote device 50. Additionally, the process 205 can optionally insert padding elements into the first message to allow varying lengths of sensitive information to be added to the first message without affecting the length of the first message.

Alternatively, rather than the process 205 inserting the IPC codes into the first message after it passes out of the application 210, in some embodiments of the present invention, the application 210 may insert the IPC codes while generating the first message for the request, such as by the application 210 containing the process 205 to insert the IPC codes, or alternatively, if the application 210 is a web browser accessing a web page, the web page could either already contain the IPCs or generate the IPCs.

The first message, containing the inserted IPCs, is then passed to the secure channel provider 220. The secure channel provider 220 establishes a secure connection to the remote device 50 and a secure channel protocol implementation engine 222 deals with determining a message authentication code (or MAC) for the message and having the message encrypted before transmission. The secure channel protocol implementation engine 222 passes the first message, containing the IPCs, to the cryptographic service provider 230 to have a MAC generated at step 232.

When a first message containing IPCs is passed to the secure channel 220, the secure channel protocol implementation engine 222 of the secure channel 220 passes the first message with the IPCs to the cryptographic service provider 230 by passing the first message from the data processing system 1 to the peripheral device 80, such as by a USB connection, etc.

Rather than the cryptographic service provider 230 generating a MAC for the first message with the IPCs contained within, the first message is passed to an insertion method 250, with access to the sensitive information, and the sensitive information is inserted in the first message, by replacing the IPC codes with the sensitive information, to form a second message containing the sensitive information. The cryptographic service provider 230 uses the insertion method 250 to obtain the sensitive information from a source 240 and insert the sensitive information into the first message in the locations indicated by the IPCs, forming a second message containing the sensitive information. The source 240, in this embodiment is the memory 620 or input device 630 of the periphery device 80.

Additionally, if padding elements were inserted by the process 205, the padding elements may be adjusted if the sensitive information is of such a length that it is needed to maintain an identical buffer length. For example, if a name is part of the sensitive information, padding elements can be removed for names that are longer than expected.

The cryptographic service provider 230 then determines a MAC for the second message containing the sensitive information at step 232 and the MAC is passed back to the secure channel provider 220. The cryptographic service provider 230 passes the MAC determined for the second message, containing the sensitive information, back to the secure channel provider 220 in the client device 10; passing the MAC, without providing any of the sensitive information to the secure channel provider 220 which remains in the peripheral device 80.

The secure channel provider 220 appends the MAC, received from the cryptographic service provider 230, to the first message containing the IPCs, to form a first unit and the first unit containing the first message with the IPCs inserted and the appended MAC is passed back to the cryptographic service provider 230 in the peripheral device 80 to encrypt the first unit.

This first unit is then passed back to the cryptographic service provider 230 to encrypt the first unit.

When the cryptographic service provider 230 receives the first unit containing the first message with the IPC codes inserted and the MAC determined for the second message with the sensitive information added, rather than encrypting this first unit, the first unit is passed to the insertion method 250. The insertion method 250 obtains the sensitive information from a source 240 outside the application program 210 and inserts the sensitive information into the first message in the first unit, using the IPCs to indicate where the sensitive information should be inserted forming a second unit containing the second message and the appended MAC. This second unit is then encrypted by the cryptographic service provider 230, at step 234, to form an encrypted unit from the second unit, with the second message containing the sensitive information and the appended MAC encrypted at step 234.

The secure channel provider 220 passes the first unit to the cryptographic service provider 230; passing the unit from the client device 10 to the peripheral device 80. The cryptographic service provider 230 uses the insertion method 250 to add the sensitive information to the first message, contained in the first unit, at the locations indicated by the IPCs to from a second unit containing the second message and the MAC and encrypts this second unit to form an encrypted unit.

The encrypted unit is passed back to the secure channel provider 220, passing it from the peripheral device 80 to the client device 10, before placing a header on the encrypted data in a transfer via secure channel protocol 224 and transmitting the encrypted unit to the remote device 50.

The instructions necessary to implement the steps 232, 250 and 234 are typically contained in the program module 622 in the memory 620 of the peripheral device 80.

Figure 8:
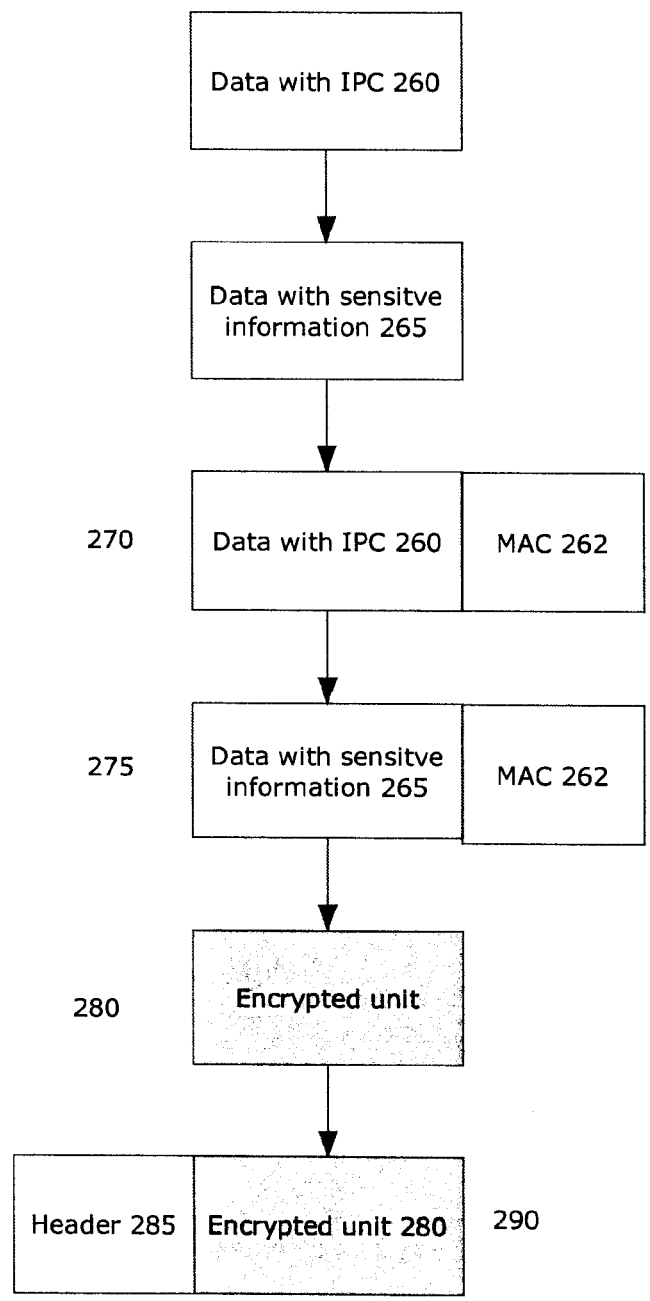
FIG. 8 is a schematic illustration showing how the data is altered in the method shown by the flowchart of FIG. 7.

FIG. 8 illustrates how the data is altered to prepare it for transmittal in accordance with the present invention. Referring to FIGS. 8 and 7, the application 210 passes a first message 260 containing IPCs rather than the sensitive information to the secure channel provider 220. The secure channel provider 220 passes the first message 260 to the cryptographic service provider 230. The cryptographic service provider 230 uses the insertion method 250 to insert the sensitive information into the first message 260 resulting in a second message 265, containing the sensitive information. The second message 265 containing the sensitive information is used by the cryptographic service provider 230 to determine a MAC 262. The MAC 262, alone, is passed to the secure channel provider 220 and the MAC 262 is appended to the first message 260, containing the IPCs, to form a first unit 270, containing the first message 260 with the IPCs inserted and the MAC 262 determined for the second message 265.

This first unit 270 is passed from the secure channel provider 220 to the cryptographic service provider 230 where the cryptographic service provider 230 uses the insertion method 250 to insert the sensitive information into the first message 260, containing the IPCs, to result in the second message 265, containing the sensitive information, in addition to the MAC 262, together forming a second unit 275. This second unit 275 is then encrypted by the cryptographic service provider 230 to form an encrypted unit 280 which is passed back to the secure channel provider 220. At this point, although the secure channel provider 220 has access to the encrypted unit 280 that contains the second message 265 with the sensitive information, the second message is in an encrypted form and the secure channel provider 220 or the application 210 have never had access to the second message 265, containing the sensitive information, when it is not in an encrypted form.

The secure channel provider 220 adds a header 285 to the encrypted unit 280 to form a data packet 290 and the data packet 290 is then ready to be transmitted to the remote unit 50.

In this manner, not only do the application 210 and the secure channel provider 220 never have access to the sensitive information in an unencrypted state, but the sensitive information never exists on the client device 10 in an unencrypted state. Rather, the sensitive information only exists in an unencrypted form on the peripheral device 80. A user still uses the client device 10 to negotiate webpages, etc. provided by the remote device 50, with the peripheral device 80 only used when sensitive or confidential information has to be transmitted to the remote device 50. This peripheral device 80 typically uses a card reader, key pad or combination, but can be any peripheral device 80 that can implement the cryptographic service provider 230 and insertion method 250 and has access to the sensitive information.

However, before the peripheral device 80 will encrypt a message for transmission to be passed through the client device 10 to the remote device 50 over the network 55, the peripheral device 80 verifies that a public key it has received for the encryption process was provided by the remote device 50. The peripheral device 80 uses a public key received from the remote device 50 as part of the encryption process used in step 234; either to encrypt the messages themselves or as part of an initial procedure to generate a set of encryption keys that will be used to encrypt the messages passing between the peripheral device 80 and the remote device 50. This public key is passed over the network 55 by the remote device 50. Interception of the this public key by third parties is not a problem because the public key is commonly known anyways and does not allow a third party to decrypt a message encrypted with the public key but rather the message can only be decrypted using a corresponding private key kept secret by the remote device 50.

In a conventional system, a digital certificate is used to authenticate that a public key is in fact from the remote device 50. The digital certificate contains the public key of the remote device 50 and a signature provided by a certificate authority verifying the digital certificate and that the public key belongs to the remote device 50. Typically, the key from the certificate authority issuing the digital certificate is obtained and used in conjunction with the signature to verify that the public key associated with the digital certificate originated from the remote device 50.

The peripheral device 80, however, is not directly connected to the network 55 in order to increase the security of the peripheral device 80. Rather, the peripheral device 80 must rely on receiving any information over the network 55 through the client device 10. This means the public key of the remote device 50 must be first transmitted to the client device 10 where it is then passed by the client device 10 to the peripheral device 80. If the client device 10 only passed the public key to the peripheral device, a malicious third party process running on the client device 10 could pass a different public key to the peripheral device 80 because the peripheral device 80 must receive all its information from the client device 10. The third party would have the corresponding private key for the substituted private key which the third party could use to decrypt messages encrypted by with the substituted public key. This could cause the peripheral device 80 to send encrypted messages which the third party could then intercept and decrypt using their private key to obtain the sensitive information in the encrypted message.

Even if the client device 10 passed the entire digital certificate containing the public key including a certification path for the digital certificate ending with a root certificate, a malicious third party process running on the client device 10 could pass a fake digital certificate and certification path ending with a substitute root certificate to the peripheral device 80 that verifies the substituted public key. Unlike the client device 10 which has access to the Internet and maintains a set of root certificates with which to verify the digital certificate, the peripheral device 80 would have to accept the root certificate it received from the client device 10 as being correct.

Typically, a device such as the client device 10 would use the Internet and the known root certificates to authenticate the remote device 50 using the digital certificate and public key of the certificate authority along with a certification path ending with a root certificate, if necessary. The client device 10 could then simply obtain the public key over the internet from the certificate authority or the public key in the root certificate.

Figure 9:
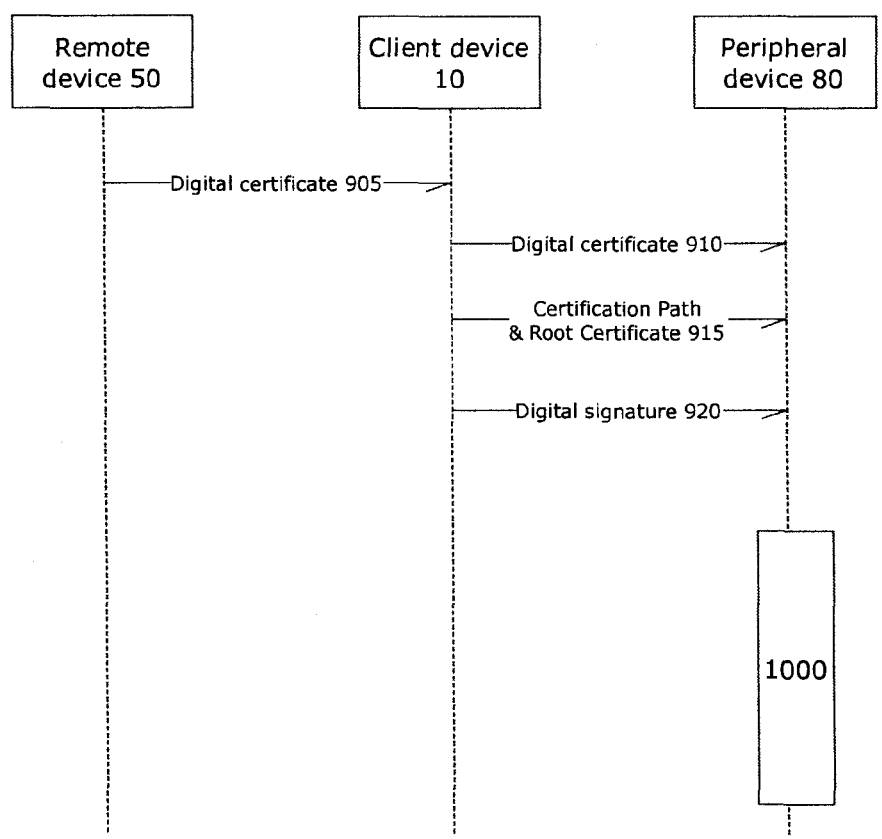
FIG. 9 is sequence diagram data passed between a remote device, a client device and the peripheral device to be able to authenticate the remote device to the peripheral device.

FIG. 9 illustrates a sequence diagram illustrating data passed from the client device 10 to the peripheral device 80 to allow the peripheral device 80 to verify a public key it has received originated with the remote device 50.

At step 905, the remote device 50 transmits a first digital certificate to the client device 10. The first digital certificate contains a public key provided by the remote device 50 that will be used to encrypt messages to the remote device 50 in the initial stages of negotiation and generating key material for encryption and decryption of messages between the remote device 50 and a digital signature provided by a certificate authority. Using a key from the certificate authority, the digital signature in the first digital certificate can be used to verify that the certificate authority issuing the first digital certificate certifies that the public key contained in the first digital certificate is provided by the remote device 50 rather than another entity.

At step 910, the client device 1 transmits the first digital certificate it received from the remote device 50 to the peripheral device 80.

Because the peripheral device 80 is not directly connected to the network 55, the peripheral device 80 will not be able to obtain a certification path beginning with a digital certificate certifying the certificate authority issuing the first digital certificate and ending in a root certificate. Rather, the peripheral device 80 must rely on receiving any certification path and the root certificate from the client device 10. Therefore, at step 915 the client device 10 passes the certification path to the peripheral device 80. The root digital certificate will contain a key enabling the peripheral device 80 to verify the authenticity of the certification path. This key can be used to either verify or reject the preceding digital certificate and the key contained in that digital certificate. In this manner, each subsequent digital certificate in the certification path can be verified until the first digital certificate has been reached and can be verified or rejected. The encryption key can be embedded inside the certificate or can be separately received from the remote device.

At step 920, the client device 10 passes a digital signature created with the key corresponding with the key 625 stored in the memory 620 of the peripheral device 80 and associated with the root certificate transmitted at step 915. The peripheral device 80 can use this digital signature and the key 625 stored in the memory 620 to determine whether the root certificate transmitted at step 915 has been certified by the holder of the corresponding key.

At this point, the peripheral device 80 has received the first digital certificate, a certification path for the first digital signature ending in a root certificate and a signature associated with the root certificate that can be verified or rejected with the key 625 stored in the memory 620 of the peripheral device 80. With this information, the peripheral device 80 invokes method 1000 to verify whether the public key in the first digital certificate can be verified as originating from the remote device 50.

Figure 10:
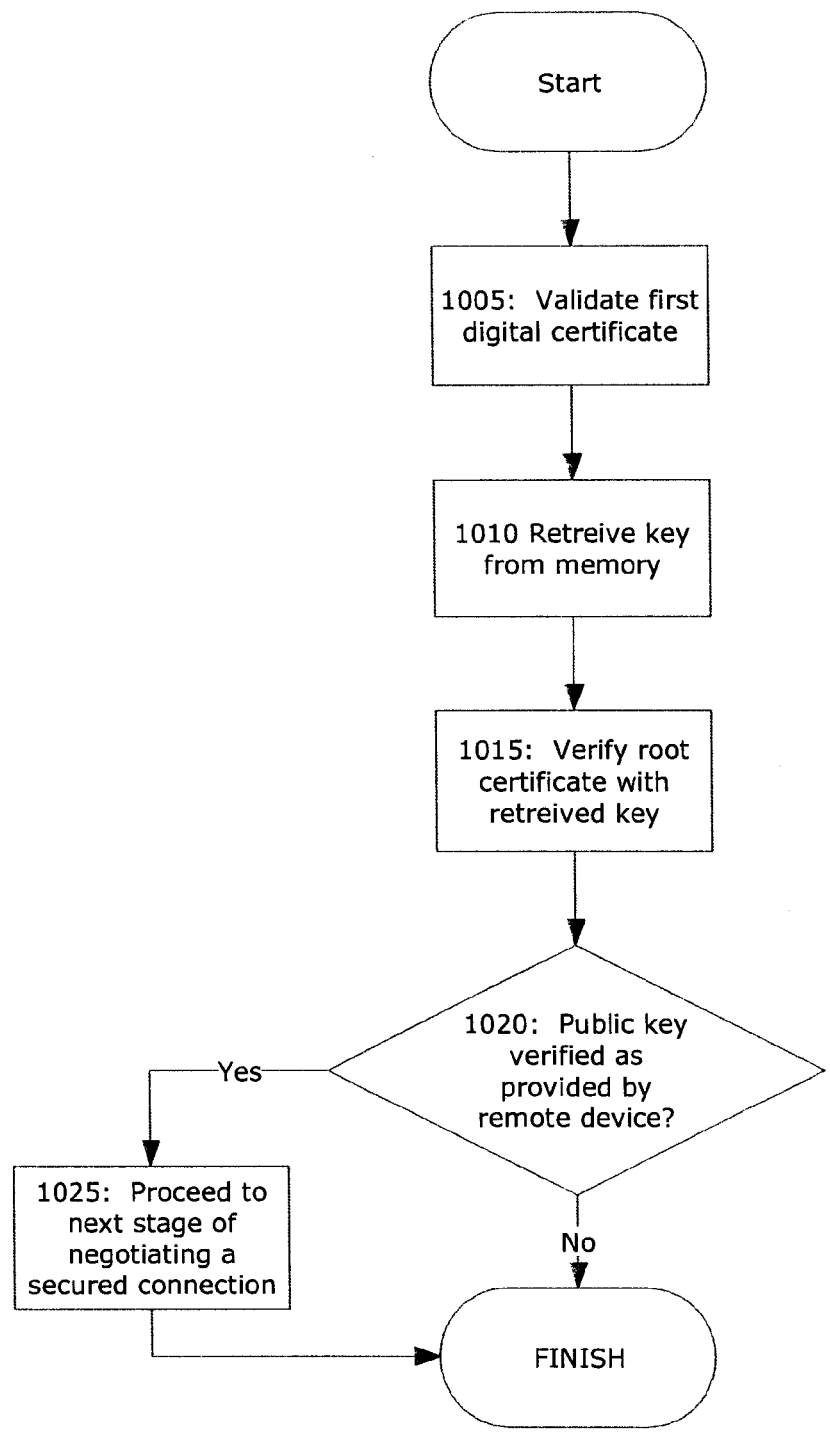
FIG. 10 is a flowchart illustrating a method of the peripheral device shown in FIG. 5 authenticating the public key provided by the remote device through the client device.

FIG. 10 is a flowchart of a method of the peripheral device 80 verifying a public key was provided by the remote device 50 using the first digital certificate, the certification path ending in the root certificate and the electronic signature associated with the root certificate.

Method 1000 begins and at step 1005 with the peripheral device 80 verifying the first digital certificate using the certification path ending in the root digital certificate. The peripheral device 80 starting with the root certificate can use the public key provided in the root certificate to verify a public key in a preceding digital certificate in the certification path which it can then use to verify a preceding public key in a preceding digital certificate. The peripheral device 80 can repeat this with each digital certificate in the certification path, moving down the certification path until it has reached the first digital certificate and can either verify or reject the public key provided in the first digital certificate originated with the remote device 50. At this point, the peripheral device 80 can verify that the root certificate verifies the public key in the first digital certificate was provided by the remote device 50.

At step 1010 the key 625 stored in the memory 620 of the peripheral device 80 is retrieved by the peripheral device 80. At step 1015 the retrieved key is applied to the digital signature associated with the root certificate. The issuer of the digital signature will have knowledge of the key 625 stored in the memory 620 of the peripheral device 80 and will have used the corresponding key to generate the digital signature. If the key 625 stored in the memory 620 of the peripheral device 80 when applied to the digital signature successfully verifies the root certificate the peripheral device 80 has received from the client device 10, the peripheral device 80 can be assured that the issuer of the digital signature has certified the root certificate can be trusted. The encryption key can be embedded inside the certificate or can be separately received from the remote device.

At step 1020, the peripheral device 80 determines if the first digital certificate has been verified by the certification path ending in the root digital certificate and that the root digital certificate was verified by the electronic signature and key 625 stored in the memory 620 of the peripheral device 80. If either cannot be verified, the peripheral device 80 cannot be assured that the public key in the first digital certificate can be trusted as originating from the remote device 50 and typically the peripheral device 80 will stop the negotiating process and a secure connection to the remote device 50 will not be established. If however, the public key in the first digital certificate is verified by both the certification path and the digital signature, the peripheral device 80 proceeds to step 1025 and precedes to the next stage of negotiation a secured connected with the remote device 50.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A system for authenticating an encryption key before transmitting encrypted messages containing sensitive information, the system comprising:

a client device, the client device being a data processing system having at least one processor and at least one memory, the client device connected to a network and operative to transmit and receive data over the network;

a remote device, the remote device being a data processing system having at least one processor and at least one memory, the remote device connected to the network and operative to transmit data to and receive data from the client device;

a peripheral device operative to encrypt messages before passing the encrypted message to the client device for transmission to the remote device, the peripheral device having at least one processor and a memory containing a first key of a cryptographic key pair, the peripheral device operatively connected to only the client device, wherein the remote device transmits a digital certificate to the client device, the digital certificate containing an encryption key and a first digital signature, the first digital signature issued by a certificate authority to verify the encryption key is associated with the remote device, in response to receiving the digital certificate from the remote device, the client device passing the digital certificate, a root certificate associated with the digital certificate and a second digital signature to the peripheral device, the second digital signature associated with the root certificate and created using a second key of the cryptographic key pair, in response to receiving the digital certificate, the root certificate and the second signature, the peripheral device uses the root certificate to certify the digital certificate and the first digital signature in the digital certificate to verify the encryption key in the digital certificate is associated with the remote device and the peripheral device retrieves the first key of the cryptographic key pair from the memory of the peripheral device and applies the first key of the encryption key pair to the second digital signature to verify the root certificate.

2. The system of claim 1 wherein the first key of the cryptographic key pair stored in the memory of the peripheral device is unalterable in the memory.

3. The system of claim 1 wherein the memory of the peripheral device is a read only memory.

4. The system of claim 1 wherein the memory of the peripheral device is a programmable read only memory.

5. The system of claim 1 wherein the memory of the peripheral device is an EPROM.

6. The system of claim 1 wherein the memory of the peripheral device is an EEPROM.

7. The system of claim 1 wherein the client device passes a certification path beginning with the digital certificate and ending with the root certificate to the peripheral device and the peripheral device uses the certification path with the root certificate to verify the digital certificate.

8. The system of claim 1 wherein the network is the Internet.

9. The system of claim 1 wherein the second signature is contained in a second digital certificate.

10. The system of claim 1 wherein if the peripheral device unsuccessfully verifies the public key in the first certificate and the root certificate, the peripheral device discontinues communication with the remote device through the client device.

11. The system of claim 1 wherein if the peripheral device successfully verifies the public key in the first certificate and the root certificate, the peripheral device negotiates a set of encryption keys and decryption keys with the remote device, the encryption keys and decryption keys never sent to the client device in an unencrypted form.

12. The system of claim 11 wherein the peripheral device generates a master secret which the peripheral device then encrypts with the encryption key before passing the encrypted master secret to the client device for transmission to the remote device.

13. A peripheral device comprising:
at least one processor; and
at least one memory containing a first key of a cryptographic key pair,
the peripheral device operatively connectable to a client device connected to a network, the client device operative to transmit messages to and receive messages from a remote device connected to the network,
the peripheral device operative to encrypt messages before passing the encrypted messages to the client device for transmission to the remote device,
wherein the peripheral device verifies an encryption key originated from the remote device by:
the client device receiving a digital certificate from the remote device, the digital certificate containing an encryption key and a first digital signature, the first digital signature issued by a certificate authority to verify that the encryption key is associated with the remote device,
in response to receiving the digital certificate from the remote device, the client device passing the digital certificate, a root certificate associated with the digital certificate and a second digital signature to the peripheral device, the second digital signature associated with the root certificate and created using a second key of the cryptographic key pair,
in response to receiving the digital certificate, the root certificate and the second signature, the peripheral device uses the root certificate to certify the digital certificate and the first digital signature in the digital certificate to verify the encryption key in the digital certificate is associated with the remote device and the peripheral device retrieves the first key of the cryptographic key pair from the memory of the peripheral device and applies the first key of the encryption key pair to the second digital signature to verify the root certificate.

14. The peripheral device of claim 13 wherein the first key of the cryptographic key pair stored in the at least one memory is unalterable.

15. The peripheral device of claim 13 wherein the at least one memory is a read only memory.

16. The peripheral device of claim 13 wherein the memory of the peripheral device is a programmable read only memory.

17. The peripheral device of claim 13 wherein the memory of the peripheral device is an EPROM.

18. The peripheral device of claim 13 wherein the memory of the peripheral device is an EEPROM.

19. The peripheral device of claim 13 wherein the client device passes a certification path beginning with the digital certificate and ending with the root certificate to the peripheral device and the peripheral device uses the certification path with the root certificate to verify the digital certificate.

20. The peripheral device of claim 13 wherein the network is the Internet.

21. The peripheral device of claim 13 wherein the second signature is contained in a second digital certificate.

22. The peripheral device of claim 13 wherein if the peripheral device unsuccessfully verifies the public key in the first certificate and the root certificate, the peripheral device discontinues communicating with the remote device through the client device.

23. The peripheral device of claim 13 wherein if the peripheral device successfully verifies the public key in the first certificate and the root certificate, the peripheral device negotiates a set of encryption keys and decryption keys with the remote device, the encryption keys and decryption keys never sent to the client device in an unencrypted form.

24. The peripheral device of claim 23 wherein the peripheral device generates a master secret which the peripheral device then encrypts with the encryption key before passing the encrypted master secret to the client device for transmission to the remote device.

25. A method of authenticating a remote server, the method comprising:
  providing a client device operatively connected to a remote device over a network;
  providing a peripheral device operatively connected to only the client device and having at least one processor and a memory containing a first key of a cryptographic key pair;
  the client device receiving a digital certificate containing an encryption key and a first signature from the remote device, the first signature issued by a certificate authority to verify the encryption key is associated with the remote device;
  in response to receiving the digital certificate from the remote device, passing the digital certificate from the client device to the peripheral device, the second digital signature associated with the root certificate and created using a second key of the cryptographic key pair;
  in response to receiving the digital certificate, the root certificate and the second signature, passing a certification path beginning with the digital certificate and ending with a root certificate from the client device to the peripheral device;
  the peripheral device verifying the encryption key in the digital certificate with the first signature in the digital certificate using the certification path including the root certificate;
  passing the second signature certifying the root certificate to the peripheral device;
  the peripheral device retrieving the first key from the memory of the peripheral device; and
  the peripheral device checking the second signature using the retrieved key to verify the root certificate.

26. The method of claim 25 wherein the key stored in the memory of the peripheral device is unalterable in the memory.

27. The method of claim 25 wherein the memory of the peripheral device is a read only memory.

28. The method of claim 25 wherein the memory of the peripheral device is a programmable read only memory.

29. The method of claim 25 wherein the memory of the peripheral device is an EPROM.

30. The method of claim 25 wherein the memory of the peripheral device is an EEPROM.

31. The method of claim 25 wherein the client device passes a certification path beginning with the digital certificate and ending with the root certificate to the peripheral device and the peripheral device uses the certification path with the root certificate to verify the digital certificate.

32. The method of claim 25 wherein the network is the Internet.

33. The method of claim 25 wherein the second signature is contained in a second digital certificate.

34. The method of claim 25 wherein if the peripheral device unsuccessfully verifies the key in the digital certificate and the root certificate, the peripheral device discontinues communication with the remote device through the client device.

35. The method of claim 25 wherein if the peripheral device successfully verifies the key in the digital certificate and the root certificate, the peripheral device negotiates a set of encryption keys and decryption keys with the remote device, the encryption keys and decryption keys never sent to the client device in an unencrypted form.

36. The method of claim 35 wherein the peripheral device generates a master secret which the peripheral device then encrypts with the encryption key before passing the encrypted master secret to the client device for transmission to the remote device.

* * * * *